United States Patent
Dawkins et al.

(10) Patent No.: US 6,920,587 B2
(45) Date of Patent: Jul. 19, 2005

(54) HANDLING MULTIPLE OPERATING SYSTEM CAPABILITIES IN A LOGICAL PARTITION DATA PROCESSING SYSTEM

(75) Inventors: George John Dawkins, Austin, TX (US); Prakash Vinodrai Desai, Round Rock, TX (US); Gordon D. McIntosh, Austin, TX (US); Kanisha Patel, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 10/132,136

(22) Filed: Apr. 25, 2002

(65) Prior Publication Data

US 2003/0204780 A1 Oct. 30, 2003

(51) Int. Cl.[7] .............................................. G06F 11/00
(52) U.S. Cl. ............................ 714/48; 714/38; 714/2
(58) Field of Search ........................... 714/48, 38, 24, 714/2, 1, 3, 26, 36; 719/318, 316

(56) References Cited

U.S. PATENT DOCUMENTS

| | | | |
|---|---|---|---|
| 4,371,930 A | 2/1983 | Kim | 364/200 |
| 4,535,455 A | 8/1985 | Peterson | 371/13 |
| 4,604,751 A | 8/1986 | Aichelmann, Jr. et al. | 371/38 |
| 5,072,450 A | 12/1991 | Helm et al. | 371/21.6 |
| 5,245,615 A | 9/1993 | Treu | 371/16.5 |
| 5,263,032 A | 11/1993 | Porter et al. | 371/40.2 |
| 5,488,731 A | 1/1996 | Mendelsohn | 395/800 |
| 5,504,859 A | 4/1996 | Gustafson et al. | 395/182.09 |
| 5,729,767 A | 3/1998 | Jones et al. | 395/882 |
| 5,889,933 A | 3/1999 | Smith | 395/182.2 |
| 5,911,084 A | 6/1999 | Jones et al. | 395/882 |
| 6,061,788 A | 5/2000 | Reynaud et al. | 713/2 |
| 6,158,025 A | 12/2000 | Brisse et al. | 714/48 |
| 6,269,409 B1 * | 7/2001 | Solomon | 719/329 |
| 6,317,848 B1 | 11/2001 | Sorens et al. | 714/48 |
| 6,594,774 B1 * | 7/2003 | Chapman et al. | 714/2 |
| 6,601,188 B1 * | 7/2003 | Wilding | 714/15 |
| 6,636,991 B1 * | 10/2003 | Quach | 714/52 |
| 6,658,486 B2 * | 12/2003 | Buzbee et al. | 719/318 |
| 6,792,564 B2 * | 9/2004 | Ahrens et al. | 714/45 |

FOREIGN PATENT DOCUMENTS

| | | | | |
|---|---|---|---|---|
| JP | 57055454 A | 4/1982 | | G06F/11/00 |
| JP | 8137764 A | 5/1996 | | G06F/12/16 |

OTHER PUBLICATIONS

Reinhardt et al., "Transient Fault Detection via Simultaneous Multithreading", ISCA 00 Vancouver, British Columbia Canada, Copyright (c) 2000 ACM 1-58113-287-5/00/06-25, pp. 25-36.

* cited by examiner

Primary Examiner—Robert Beausoliel
Assistant Examiner—Marc M. Duncan
(74) Attorney, Agent, or Firm—Duke W. Yee; Mark E. McBurney; Michael R. Nichols

(57) ABSTRACT

A method, computer program product, and data processing system for handling errors or other events in a logical partition (LPAR) data processing system is disclosed. When an operating system is initialized in a logical partition, it registers its capabilities for handling particular errors or other events with management software. When an error or other event affecting that logical partition occurs, the management software checks to see if the particular error or event is one that the operating system is capable of handling. If so, the operating system is notified. Otherwise, the management software directs the operating system to take other appropriate action, such as termination of the operating system and/or partition.

32 Claims, 4 Drawing Sheets

HANDLING MULTIPLE OPERATING SYSTEM CAPABILITIES IN A LOGICAL PARTITION DATA PROCESSING SYSTEM

BACKGROUND OF THE INVENTION

1. Technical Field

The present invention is related generally to the management of multiple operating system partitions in a logical partition data processing system and more specifically to the handling of errors and other events.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

With respect to hardware resources in a LPAR system, these resources are disjointly shared among various partitions, themselves disjoint, each one seeming to be a stand-alone computer. These resources may include, for example, input/output (I/O) adapters, memory dimms, non-volatile random access memory (NVRAM), and hard disk drives. Each partition within the LPAR system may be booted and shutdown over and over without having to power-cycle the whole system.

In reality, some of the I/O devices that are disjointly shared among the partitions are themselves controlled by a common piece of hardware, such as a host Peripheral Component Interface (PCI) bridge, which may have many I/O adapters controlled or below the bridge. This bridge may be thought of as being shared by all of the partitions that are assigned to its slots. Hence, if the bridge becomes inoperable, it affects all of the partitions that share the devices that are below the bridge. Indeed, the problem itself may be so severe that the whole LPAR system will crash if any partition attempts to further use the bridge. In other words, with a crash, the entire LPAR system fails. The normal course of action is to terminate the running partitions that share the bridge, which will keep the system from crashing due to this failure.

What usually occurs is an I/O adapter failure that causes the bridge to assume a non-usable (error) state. At the time of occurrence, the I/O failure invokes a machine check interrupt (MCI) handler, which, in turn, will report the error and then terminate the appropriate partitions. This process is a "normal" solution that prevents the whole LPAR system from crashing due to this problem.

Depending on the particular operating system that is running in a given partition, however, some errors may be recoverable by the operating system and others not. If an error can be recovered from by a particular operating system, the best course of action would be to notify the operating system of the error so that appropriate action can be taken. If an operating system does not have the capability to recover from the error, however, attempting to notify the operating system of the error will do no good; the operating system, not being able to interpret the error notification, will simply continue regular processing until a crash occurs.

What is needed, then, is a way to notify operating systems that are capable of handling particular errors when the errors occur and terminating the operating systems that are not capable of handling the particular errors.

SUMMARY OF THE INVENTION

The present invention provides a method, computer program product, and data processing system for handling errors or other events in a logical partition (LPAR) data processing system. When an operating system is initialized in a logical partition, it registers its capabilities for handling particular errors or other events with management software. When an error or other other event affecting that logical partition occurs, the management software checks to see if the particular error or event is one that the operating system is capable of handling. If so, the operating system is notified. Otherwise, the management software directs the operating system to take other appropriate action, such as termination of the operating system and/or partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
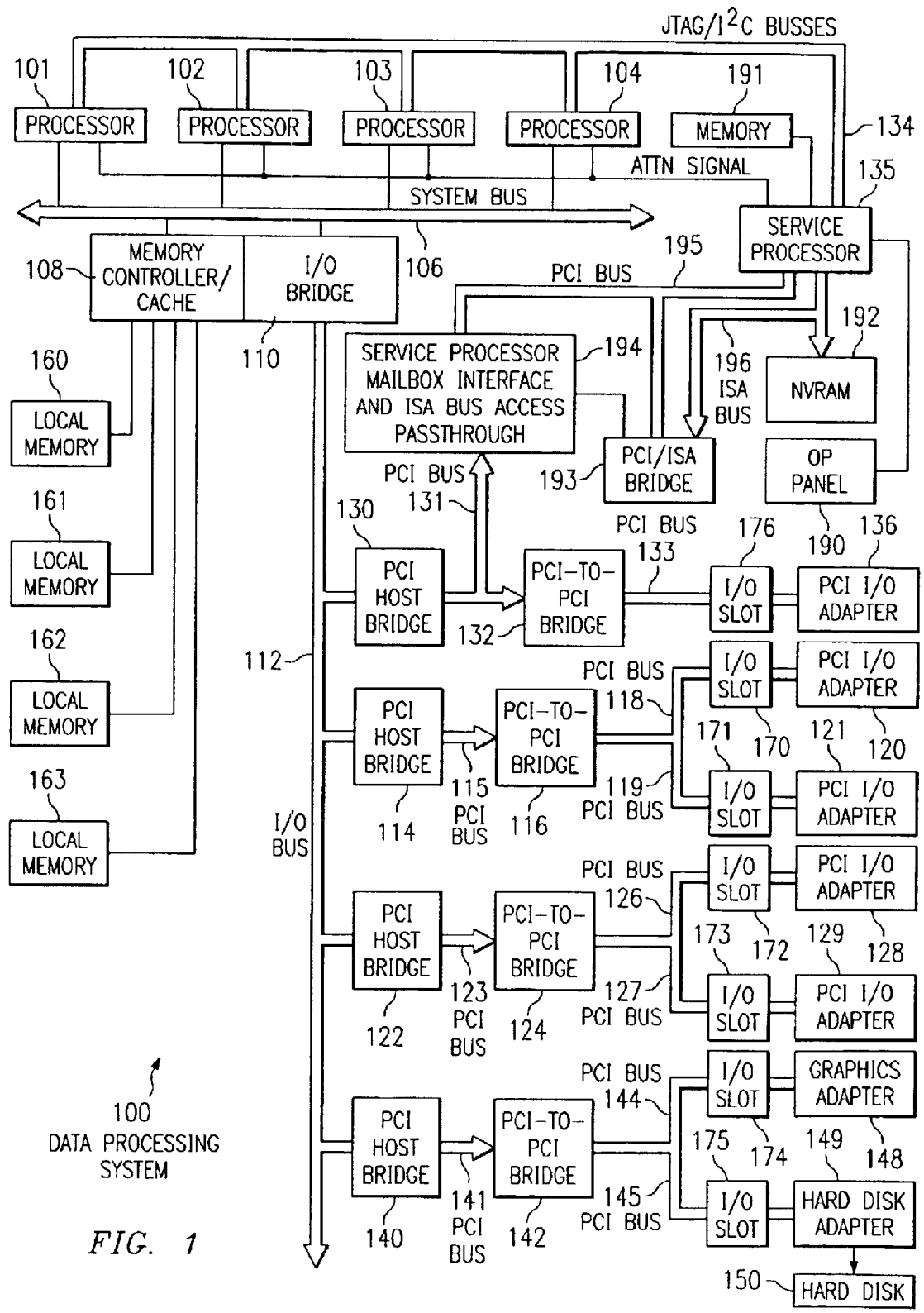
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and PCI I/O adapters 120, 128, and 129 may be assigned to logical partition PI; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux operating system may be operating within logical partition P1.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface between PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and host bridge 140. Hard disk adapter 149 may be placed into I/O slot 175, which is connected to PCI bus 145. In turn, this bus is connected to PCI-to-PCI bridge 142, which is connected to PCI Host Bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/scan I$^2$C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 101–104 for execution of the code loaded into host memory 160–163. While the host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110. Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
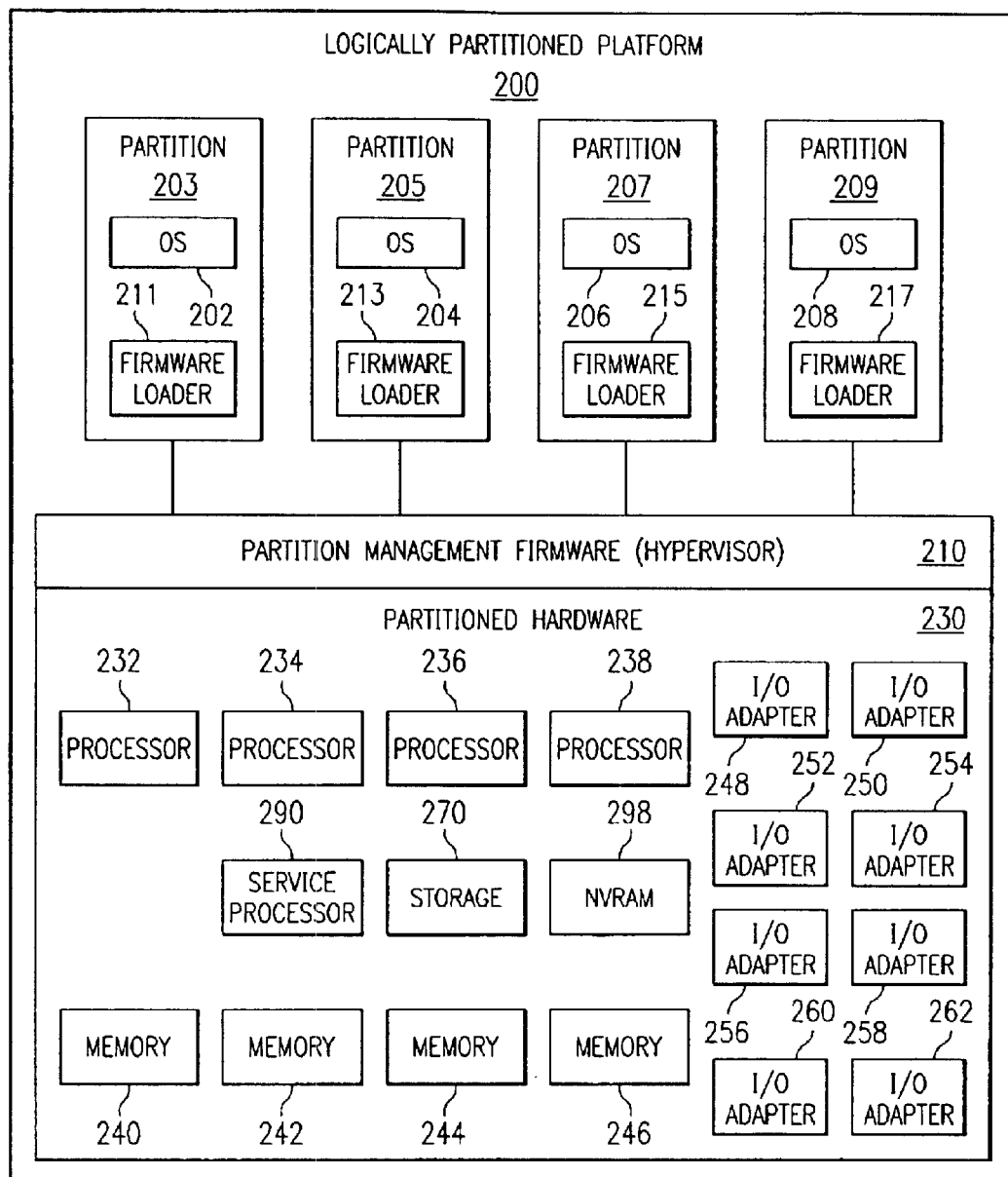
FIG. 2 is a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209. Additionally, these partitions also include firmware loaders 211, 213, 215, and 217. When partitions 203, 205, 207, and 209 are instantiated, a copy of the open firmware is loaded into each partition by the hypervisor's partition manager. The processors associated or assigned to the partitions are then dispatched to the partitions' memory to execute the partition firmware.

Partitioned hardware 230 includes a plurality of processors 232–238, a plurality of system memory units 240–246, a plurality of input/output (I/O) adapters 248–262, and a storage unit 270. Partition hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logically partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 202, 204, 206, and 208 by virtualizing all the hardware resources of logically partitioned platform 200.

The present invention is directed toward a method, computer program product, and data processing system for managing the handling of events or errors by different operating systems executing in different logical partitions with a logical partition data processing system. In a preferred embodiment of the present invention, when execution of an operating system within a logical partition is initiated, the operating system, or a suitable loading program for loading the operating system, will register with management software (or hypervisor), capabilities of the operating system for handling particular errors or events. The management software will then use that information to determine how errors or events should be treated with respect to the operating system by the management software.

Figure 3:
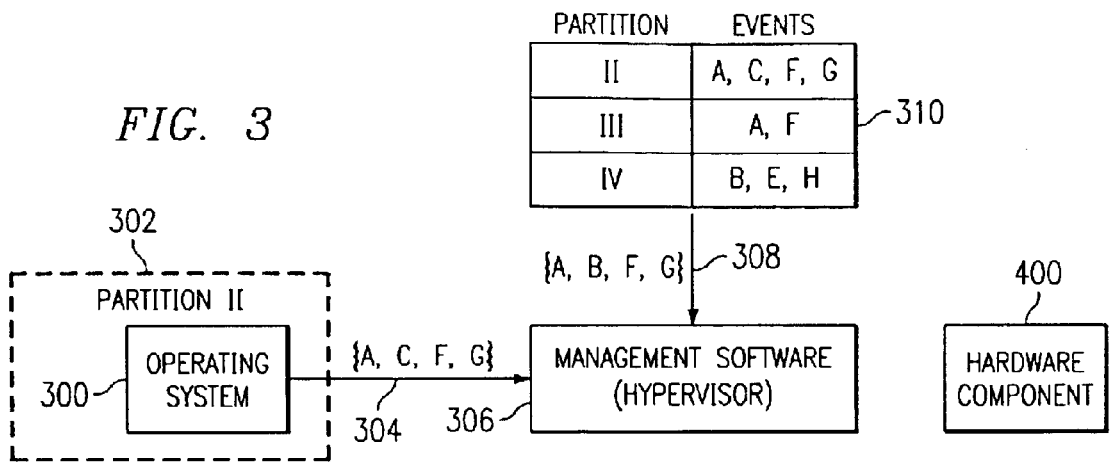
FIG. 3 is a diagram depicting a process of an operating system registering its capabilities to handle particular errors or events with management software in accordance with a preferred embodiment of the present invention.

FIG. 3 is a diagram depicting a process of an operating system registering its capabilities to handle particular errors or events with management software in accordance with a preferred embodiment of the present invention. Operating system 300 has been initiated and now executes in logical partition 302. Operating system 300 registers its capabilities with management software 306 by transmitting information (304) describing a set of errors and/or events that operating system 300 is capable of handling. A set is a collection of zero or more items. In this case, the items in the set are identifications of errors or events that operating system 300 is capable of handling. Examples of errors and events include, but are not limited to, bus errors, sector look aside buffer errors, translation look aside buffer errors, input/output errors, user input, new messages or communications available, and so forth. In the diagram, these errors and event are represented by capital letters.

Management software 306 stores the information (308) in a data structure 310 in memory. Data structure 310 allows management software 306 to identify which events or errors any given operating system executing in any of the logical partitions of the data processing system are capable of handling.

Figure 4:
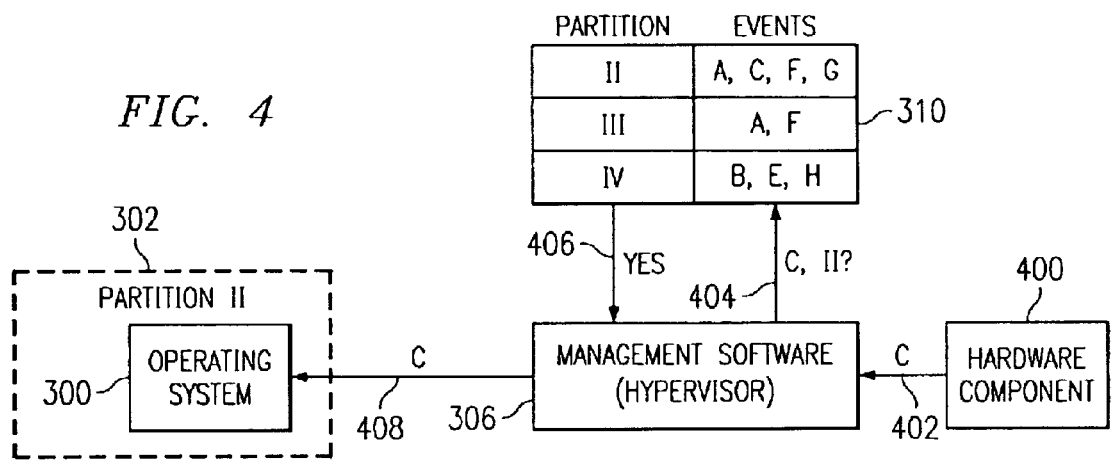
FIG. 4 is a diagram depicting a process of managing an event or error in a preferred embodiment of the present invention when the operating system is capable of handling the error or event.

FIG. 4 is a diagram depicting a process of managing an event or error in a preferred embodiment of the present invention when the operating system is capable of handling the error or event. Hardware component 400 experiences an event or error (402) of which management software 306 becomes aware. Management software 206, determining that event 402 may affect operating system 200 executing in partition 202, queries (404) data structure 310 to determine if operating system 200 is capable of handling the error or event. In this case, operating system 200 is capable of handling the error or event, so query 404 is satisfied with a positive result (406). Management software 306, in response to this positive result, notifies (408) operating system 200 of the error or event. Operating system 200 can then take appropriate action with respect to the error or event, according to its programming.

Figure 5:
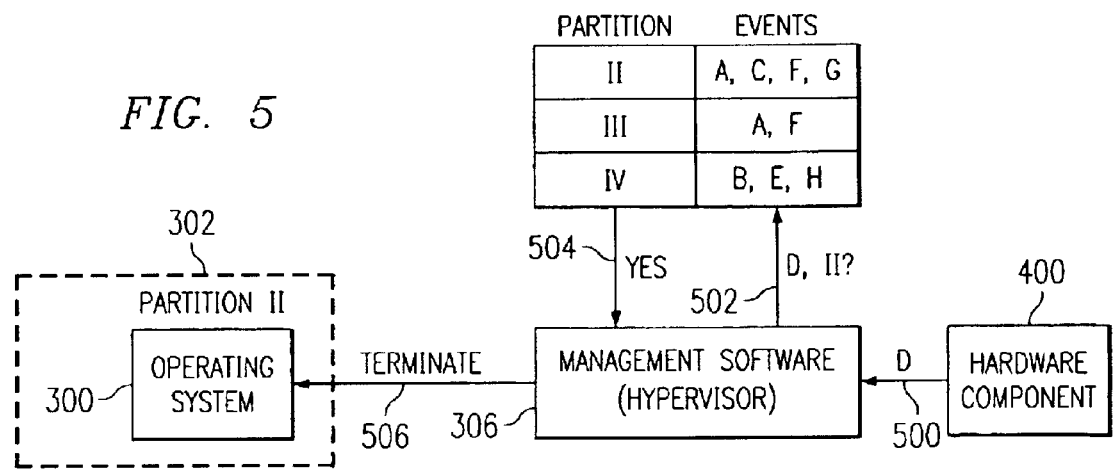
FIG. 5 is a diagram depicting a process of managing an error or event in a preferred embodiment of the present invention when the operating system is incapable of handling the error or event.

FIG. 5 is a diagram depicting a process of managing an error or event in a preferred embodiment of the present invention when the operating system is incapable of handling the error or event. Hardware component 400 experiences an event or error 500 of which management software 306 becomes aware. Management software 306 queries (502) data structure 310 to determine if operating system 300 is capable of handling the event or error. This time, because operating system 200 is incapable of handling the particular error or event that has occurred, a negative result 504 is returned. Management software 306 must now take responsibility for handling the error or event. It does this by directing operating system 300 to perform an appropriate action. For example, in the case of an error management software 306 may direct operating system 300 to terminate (506), by reporting a fatal error to operating system 300, for instance. In other words, management software 306 may direct operating system 300 to perform a safe shut down. If operating system 300 does not successfully complete what it is directed to do by management software 306, management software 306 may be forced to terminate partition 302 to avoid further errors.

Figure 6:
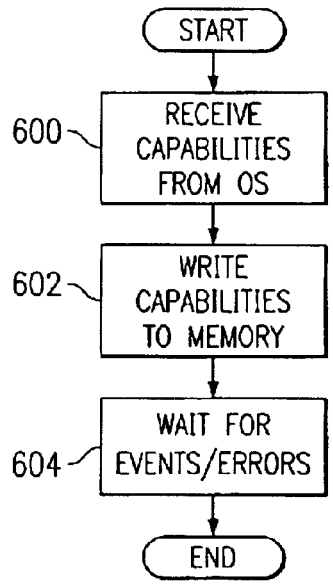
FIG. 6 is a flowchart representation of a process of receiving management capabilities from an operating system in accordance with a preferred embodiment of the present invention.

FIG. 6 is a flowchart representation of a process of receiving management capabilities from an operating system in accordance with a preferred embodiment of the present invention. First, management software receives the capabilities of an operating system to handle particular errors or events (step 600). Management software then writes these capabilities into a data structure in memory (step 602). Then, management software waits for events or errors to occur (step 604).

Figure 7:
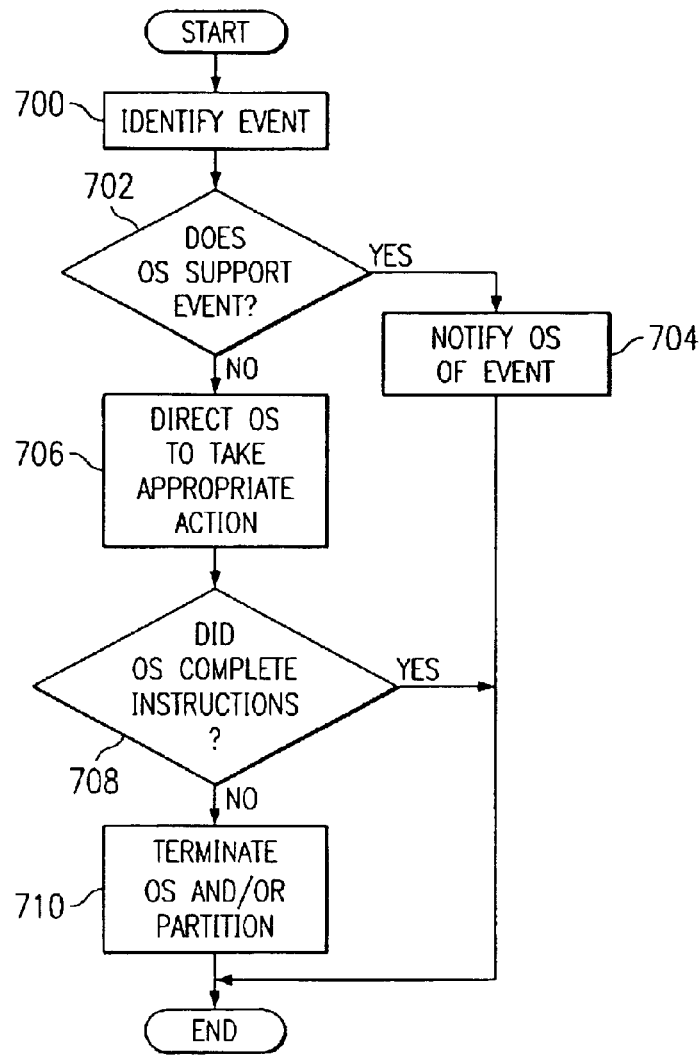
FIG. 7 is a flowchart representation of a process of managing events with respect to an operating system executing in a logical partition in accordance with the preferred embodiment of the present invention.

FIG. 7 is a flowchart representation of a process of managing events with respect to an operating system executing in a logical partition in accordance with the preferred embodiment of the present invention. First, management software identifies an event, which may be an error (step 700). Next, management software determines if the operating system residing in a particular partition supports the event (step 702). In other words, management software determines whether the operating system is capable of handling the event. If so, then management software notifies the operating system of the event so that it can be handled by the operating system (step 704), and the process terminates. If the process does not support the event, then management software directs the operating system to take the appropriate action, such as performing a safe shut down (706). Next, management software determines whether the operating system completed the task it was directed to do (step 708). If so, then the process simply terminates. If not, however, then management software will finally terminate the execution of the operating system and/or the partition it is executed in (step 710).

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   receiving, from an operating system, information identifying a set of events that the operating system is capable of handling:
   in response to an occurrence of an event, determining whether the event is contained within the set of events;
   in response to a determination that the event is contained within the set of events, notifying the operating system of the event; and
   in response to a determination that the event is not contained within the set of events, directing the operating system to perform an operation.

2. The method of claim 1, wherein the event is an error.

3. The method of claim 2, wherein the error has occurred in a hardware component.

4. The method of claim 1, wherein the operation is terminating execution of the operating system.

5. The method of claim 4, wherein the operating system is executing within a logical partition in a data processing system and wherein terminating execution of the operating system includes terminating the logical partition.

6. The method of claim 1, wherein the operation is handling a fatal error.

7. The method of claim 1, further comprising:
   in response to directing the operating system to perform the operation, determining whether the operating system has performed the operation; and
   in response to an determination that the operating system has failed to perform the operation, terminating execution of the operating system.

8. The method of claim 7, wherein the operating system is executing within a logical partition in a data processing system and wherein terminating execution of the operating system includes terminating the logical partition.

9. A method comprising:
   initiating an operating system within a logical partition of a data processing system; and
   registering with management software operating in the data processing system a set of error conditions capable of being handled by the operating system.

10. The method of claim 9, wherein the management software comprises firmware of the data processing system.

11. The method of claim 9, wherein the management software executes in an environment that is external to the logical partition.

12. A computer program product in a computer-readable medium comprising functional descriptive material that, when executed by a computer, enables the computer to perform acts including:

receiving, from an operating system, information identifying a set of events that the operating system is capable of handling;

in response to an occurrence of an event, determining whether the event is contained within the set of events;

in response to a determination that the event is contained within the set of events, notifying the operating system of the event; and in response to a determination that the event is not contained within the set of events, directing the operating system to perform an operation.

13. The computer program product of claim 12, wherein the event is an error.

14. The computer program product of claim 13, wherein the error has occurred in a hardware component.

15. The computer program product of claim 12, wherein the operation is terminating execution of the operating system.

16. The computer program product of claim 15, wherein the operating system is executing within a logical partition in a data processing system and wherein terminating execution of the operating system includes terminating the logical partition.

17. The computer program product of claim 12, wherein the operation is handling a fatal error.

18. The computer program product of claim 12, comprising additional functional descriptive material that, when executed by the computer, enables the computer to perform additional acts including:

in response to directing the operating system to perform the operation, determining whether the operating system has performed the operation; and in response to an determination that the operating system has failed to perform the operation, terminating execution of the operating system.

19. The computer program product of claim 18, wherein the operating system is executing within a logical partition in a data processing system and wherein terminating execution of the operating system includes terminating the logical partition.

20. A computer program product in a computer readable medium containing functional descriptive material that, when executed by a computer, enables the computer to perform acts including:

initiating an operating system within a logical partition of a data processing system; and registering with management software operating in the data processing system a set of error conditions capable of being handled by the operating system.

21. The computer program product of claim 20, wherein the functional descriptive material forms a portion of the operating system.

22. The computer program product of claim 20, comprising additional functional descriptive material that, when executed by the computer, enables the computer to perform additional acts including:

loading the operating system from a storage device.

23. A data processing system comprising:

a processing unit including at least one processor;

memory in communication with the processing unit; and firmware stored within the memory, wherein the processing unit executes the firmware to perform acts including:

receiving, from an operating system, information identifying a set of events that the operating system is capable of handling;

in response to an occurrence of an event, determining whether the event is contained within the set of events;

in response to a determination that the event is contained within the set of events, notifying the operating system of the event; and in response to a determination that the event is not contained within the set of events, directing the operating system to perform an operation.

24. The data processing system of claim 23, wherein the event is an error.

25. The data processing system of claim 24, wherein the error has occurred in a hardware component.

26. The data processing system of claim 23, wherein the operation is terminating execution of the operating system.

27. The data processing system of claim 26, wherein the operating system is executing within a logical partition of the data processing system and wherein terminating execution of the operating system includes terminating the logical partition.

28. The data processing system of claim 23, wherein the operation is handling a fatal error.

29. The data processing system of claim 23, wherein the processing unit executes the firmware to perform the additional acts of:

in response to directing the operating system to perform the operation, determining whether the operating system has performed the operation; and in response to an determination that the operating system has failed to perform the operation, terminating execution of the operating system.

30. The data processing system of claim 29, wherein the operating system is executing within a logical partition of the data processing system and wherein terminating execution of the operating system includes terminating the logical partition.

31. A data processing system comprising:

means for receiving, from an operating system, information identifying a set of events that the operating system is capable of handling;

means, responsive to an occurrence of an event, for determining whether the event is contained within the set of events;

means, responsive to a determination that the event is contained within the set of events, for notifying the operating system of the event; and means, responsive to a determination that the event is not contained within the set of events, for directing the operating system to perform an operation.

32. A data processing system comprising:

means for initiating an operating system within a logical partition of a data processing system; and means for registering with management software operating in the data processing system a set of error conditions capable of being handled by the operating system.

* * * * *